Figure 1:
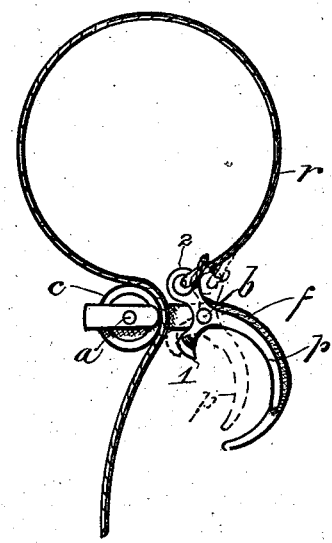

(No Model.)

J. F. MAINS.
CORN AND FODDER COMPRESSOR.

No. 379,967. Patented Mar. 27, 1888.

Witnesses.
H. Sturm,
M. Loeper.

Inventor.
John F. Mains,
by Jacob W. Loeper atty.

UNITED STATES PATENT OFFICE.

JOHN F. MAINS, OF INDIANAPOLIS, INDIANA.

CORN AND FODDER COMPRESSOR.

SPECIFICATION forming part of Letters Patent No. 379,967, dated March 27, 1888.

Application filed March 2, 1887. Serial No. 229,448. (No model.)

*To all whom it may concern:*

Be it known that I, JOHN F. MAINS, of the city of Indianapolis, county of Marion, and State of Indiana, have invented certain new and useful Improvements in Corn and Fodder Compressors, of which the following is a specification.

The object of my invention is to provide a device for compressing cornstalks, sheaves, grain-sacks, or fodder of any description. I accomplish this object by means of the device described in this specification, and illustrated in the drawings filed herewith, and made a part hereof, and in which similar letters of reference relate to similar parts of my invention.

Figure 2:

In the drawings, Figure 1 represents a plan view of my invention, and Fig. 2 represents a side view of the same, a portion of the cord and the loop 2 being removed to show the other parts more clearly.

In Fig. 1, $f$ is the frame of my device, one end of the same being constructed in such a manner as to receive a grooved roller, $c$, loosely revolving on pivot $a$. The other end of said frame is formed into a hook and serves as a handle.

$p$ is a lever with fulcrum loosely pivoted to frame $f$ by a pivot, $b$, with short levers or arms 1 and 2, formed angular to each other. Arm 2 is provided on its end with an opening or loop-hole to receive the rope $r$, looped into the same. The other arm, 1, is constructed in such a manner as to touch the rope $r$, which is laid over the periphery of roller $c$, and is moved toward the roller $c$, as indicated in the drawings by the dotted lines.

The whole of my device may be made of malleable, cast, or any suitable material.

The manner of operating my device is as follows: After the corn or fodder has been cut and piled into heaps I hold the frame $f$ and lever $p$ in one hand, then take the rope $r$ around the corn-heap ready to be shocked, pass the other end of rope $r$ over the periphery of pulley $c$, and pulling the rope, by means of the leverage of roller $c$, compress said fodder or corn into a sheaf or shock. Having compressed it as firmly as desirable, I let go of the long arm of the lever $p$, as indicated by the dotted lines of Fig. 1, pressing the short arm 1 firmly against the rope $r$ and pulley $c$, preventing said rope $r$ from slipping backward. I now take either twine or wire, as desired, and tie said shock. I am now ready to remove my device, which is done by grasping the long arm of the lever $p$, relieving the pressure from the roller $c$, and drawing the rope away from the shock.

I am aware that devices of the above general character have heretofore been made; but none, so far as I am informed, have ever been provided with the main handle and the trigger-like lever for clamping the rope, so disposed as to be held in one hand and the rope locked by the simple releasing of the trigger-lever.

Having thus described my invention, its purposes and uses, what I claim as new, and desire to secure by Letters Patent, is—

In a corn and fodder compressor, the combination, with the frame, as $f$, provided with a curved handle, and a pulley journaled in the frame, of the lever, as $p$, pivoted to the frame and provided with a curved operating-handle adapted to conform to the curve of the frame-handle, and with an eye-arm, 2, and clamp-arm 1, and a rope attached to the eye-arm and passing over the side of the pulley toward the lever, all constructed and arranged substantially as set forth.

In witness whereof I have hereunto set my hand and seal, at Indianapolis, Indiana, this 21st day of February, A. D. 1887.

JOHN F. MAINS. [L. S.]

In presence of—
CHAS. G. MUELLER,
FRANK D. RHODES.